Patented Jan. 17, 1950

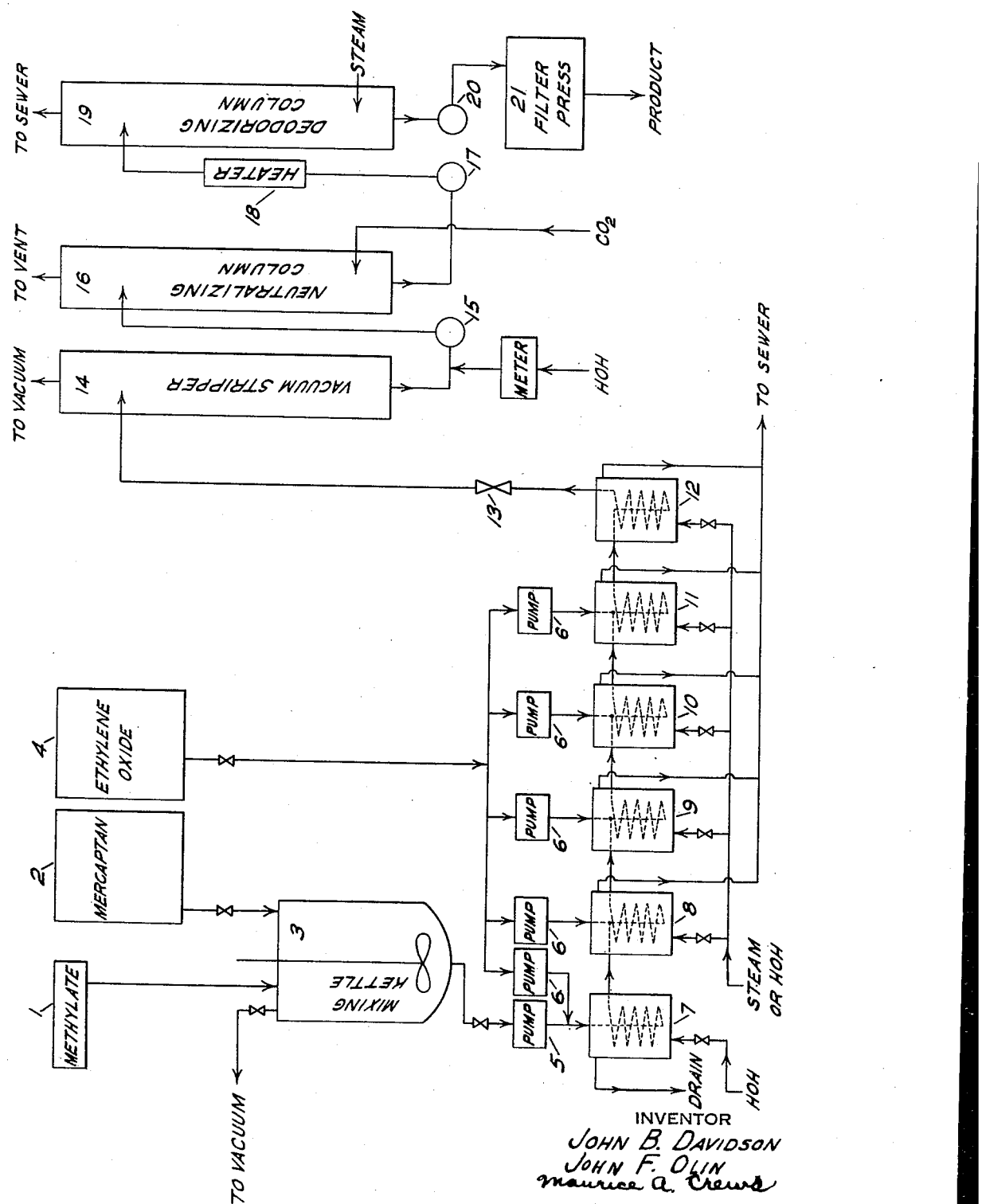

2,494,610

UNITED STATES PATENT OFFICE 2,494,610

MANUFACTURE OF GLYCOL THIOETHERS

John B. Davidson and John F. Olin, Grosse Ile, Mich., assignors to Sharples Chemicals Inc., a corporation of Delaware Application February 6, 1947, Serial No. 726,840

11 Claims. (Cl. 260—609)

The present invention relates to condensation of aliphatic mercaptans containing from 6 to 24 carbon atoms with ethylene oxide and its equivalents to form glycol thioethers. Compounds of this type are useful as surface active agents and intermediates in synthesis of other organic compounds. While the invention is applicable, in certain of its broader aspects, to condensation of ethylene oxide with mercaptans regardless of the ratio of ethylene oxide to mercaptan entering into the condensation reaction, it is concerned particularly with manufacture of compounds having the formula $RS(CH_2CH_2O)_nCH_2CH_2OH$, in which R represents an alkyl radical having from 6 to 24 carbon atoms and $n$ is a number greater than 2.

The fundamental equation with which the reaction of the invention is concerned in manufacture of compounds of the foregoing formula may be represented as follows:

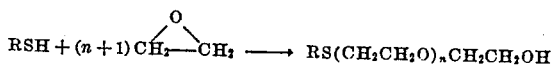

$$RSH + (n+1)CH_2\overset{O}{-\!\!\!-}CH_2 \longrightarrow RS(CH_2CH_2O)_nCH_2CH_2OH$$

An alkaline catalyst is used in promoting the condensation of the foregoing equation in the practice of the invention. In this connection there may be used, for example, an alkali metal hydroxide, oxide, alcoholate, mercaptide, or indeed any alkaline substance known to the art to be capable of catalyzing the condensation of ethylene oxide with mercaptans.

While important advantages may be attained in practice of the invention in condensation of mercaptans containing between 6 and 24 carbon atoms with ethylene oxide regardless of the structure of the mercaptan, it has particular value in condensation of tertiary alkyl mercaptans with ethylene oxide. Among the advantages attained by condensation of these and other mercaptans of 6 to 24 carbon atoms with ethylene oxide in practice of the invention are the following:

1. The amount of by-product formation is minimized, thereby improving the yield of desired thioether material useful as a surface active agent or for other purpose intended. By the practice of the invention, the formation of impurities imparting an unpleasant odor to the product, and other impurities causing a decrease in surface activity of the product and imparting a dark color to the product, is minimized.

2. A product of greater uniformity, both as to chemical constitution and physical state, is obtained. It is evident from the nature of the foregoing equation that the product will comprise a mixture of glycol thioether molecules of varying ethoxy content. This varying ethoxy content is undesirable, for it would be best to provide a product of uniform chemical composition having an ethoxy content optimum for the particular use to which the product is to be applied. By the practice of the invention, the glycol thioether product is must more nearly uniform in this regard than products of similar character obtainable by prior art procedure, and practice of the invention thus makes it possible to obtain a material which is more desirable for the surface active or other use to which it is to be put, and a product may be obtained which is more nearly homogeneous as to physical state than products of this type heretofore available.

3. A product is obtained which is more stable than products of this type obtained by other processes.

In order to obtain the foregoing advantages in optimum degree in practice of the invention, the mercaptan is first condensed with a small amount of ethylene oxide (relative to that ultimately entering into the condensation reaction to form a surface active agent) at a temperature considerably lower than temperatures which have heretofore been used in effecting such condensation. In case a glycol thioether of higher ethoxy content is to be produced, a further quantity of ethylene oxide is thereafter added to the initial reaction mixture, and the condensation of this further quantity of ethylene oxide with the initial reaction product is preferably conducted at a substantially higher temperature than that of the initial reaction. The addition of this further quantity of ethylene oxide is preferably performed progressively as the reaction proceeds.

At the end of the condensation reaction, the alkalinity of the reaction mixture (due to the alkaline catalyst used) is reduced or eliminated by treatment of the reaction mixture with an acidic substance. A feature of the invention consists in control of the pH of the product. While this may be achieved by carefully controlled use of a strong acid, a particular feature consists in the use for this purpose of a weak acid or acid salt, capable of reducing the alkalinity and thereby providing a stable product while avoiding the danger of excess acidulation. Such excess acidulation is undesirable because of the fact that a product of too low pH is unstable, especially in the case of glycol thioethers derived from tertiary mercaptans. Tertiary mercaptans obtained by sulfhydration of polymerized olefins yield glycol thioethers which require especially careful handling in this connection, and by use of weak acidulants, the danger of destroying the stability of the product by excess acidulation is avoided.

In the practice of the invention, the acidulation is preferably accomplished in the presence of water, and the present invention may be accomplished with particular advantage by the addition of water to the reaction mixture followed by contact of the resulting mixture with carbon dioxide to effect acidulation.

After the acidulation has been accomplished, the reaction mixture is contacted with a stream of gas to remove volatile and odoriferous impurities. By control of the acidulating step to obtain a product which is substantially neutral prior to the removal of impurities by the gas treatment, this final treatment may be accomplished without significant decomposition of the product.

Further features and advantages of the invention, and the details by which it is practiced, will be evident from a reading of the following detailed description in the light of the attached flow sheet, which illustrates one embodiment of practice of the invention in continuous operation.

In the practice of the invention as illustrated in the flow sheet, sodium methylate catalyst from storage vessel 1 may be passed into contact with mercaptan from storage vessel 2 in mixing kettle 3. The resulting mixture is thoroughly agitated in kettle 3 and heated to a temperature between 60 and 70° C. under vacuum. The sodium methylate reacts with the mercaptan to form a mixture of mercaptan and mercaptide, and the methanol released by this reaction is removed by application of vacuum.

The mercaptan-mercaptide mixture in kettle 3 is next cooled to room temperature and fed by pump 5 into confluence with a stream of ethylene oxide fed by pump 6 from storage vessel 4. From the zone of confluence, the resulting reaction mixture passes through reaction system 7—12. The first unit 7 of this reaction system may comprise a steel coil 200 ft. long and ¼ inch in internal diameter, and this coil may be immersed in a bath of circulating cold water. The requisite amount of liquid ethylene oxide necessary to form the desired polyglycol ether reaction product may be distributed in five approximately equal streams by the pump 6 to the inlets of a series of reactor coils of the type of coil 7. The coils of reaction unit 8—11 may each consist of a steel coil 300 ft. long and ½ inch in internal diameter immersed in a bath of boiling water. Unit 12 may comprise a steel coil 250 ft. long and ¾ inch in internal diameter immersed in boiling water. It will be noted that no ethylene oxide is introduced directly into the mixture entering this last coil, as this coil is designed to provide for substantial completion of the condensation of any ethylene oxide failing to react in the preceding units.

Material discharged from coil 12 passes through a pressure release valve 13 into the upper section of vacuum stripper 14 which may be a stripping column provided with a vacuum connection through which any ethylene oxide is removed. A stream of water is metered into the stripped product passing from the bottom of the column 14; 10% of water may, for example, be added to the reaction mixture at this point. The diluted thioether product is next passed by pump 15 into the upper section of a packed column 16 and flows downward into countercurrent contact with a sufficient stream of carbon dioxide introduced toward the bottom of the column to bring about neutralization of alkaline constituents.

From the bottom of the neutralizing column 16, the product is forced by pump 17 through heater 18 and is introduced at about 105° C. into the upper section of a packed column 19 wherein it flows downward countercurrent to slightly superheated steam. From the bottom of deodorizing column 19, the product is fed by pump 20 through a filter press 21 which effects removal of solid particles.

In the use of a reaction system as described above in manufacture of a reaction product corresponding to the average formula

$C_{12}H_{25}S(CH_2CH_2O)_7CH_2CH_2OH$ for example, by condensing with ethylene oxide tertiary dodecyl mercaptan obtained by sulfhydration of tri-isobutylene, the following details of procedure may be practiced. The mercaptan is first mixed with an amount of sodium methylate or the like which may constitute from 1 to 10% of a molecular equivalent of the mercaptan. After mixing and removal of methanol, as described above, the mercaptan containing sodium mercaptide as catalyst is pumped to reaction unit 7. An amount of ethylene oxide which may comprise from 0.5 to 3 molecular equivalents of the equivalents of the mercaptan is pumped into confluence therewith and into the unit 7. The reaction mixture passing through unit 7 is maintained at a temperature below 75° C., and preferably between 0 and 65° C. during passage through the coil of that unit, by the cooling water. An amount of ethylene oxide in excess of 0.5 molecular equivalent, and usually about 1 molecular equivalent, will condense with the mercaptan in this first reaction unit.

The further quantity of ethylene oxide necessary to complete the reaction to form a product having an average of the desired number of $(CH_2CH_2O)$ radicals is passed into the reaction mixture in a plurality of separate streams by the pumps 6. While considerable latitude is permissible in this connection, best results may be attained by dividing the ethylene oxide introduced into units 8—11 into equal parts and controlling the reaction temperature in these units and rate of feed to cause reaction in each unit of approximately the amount of ethylene oxide introduced into that unit. By this procedure the reaction may be caused to precede at a substantially constant rate throughout the secondary portion of the reaction system 8—12.

The reaction mixture is maintained at a temperature above 85° C. during passage through units 8—12. In this connection it should be noted that the importance of use of a lower temperature in the unit 7 is due both to the instability of the mercaptan and to the high velocity and exothermic nature of the initial reaction. Once the mercaptan has reacted with a molecular equivalent of ethylene oxide, the resulting hydroxy alkyl thioether can be subjected to higher temperatures in the presence of ethylene oxide without deleterious results, and it is desirable that the temperature be higher in the secondary reaction zone in order to insure reasonably rapid completion of the reaction. Use of similar temperatures in the initial reaction zone, on the other hand, would result in formation of undesired by-products and manufacture of a thioether product of inferior quality as to color, odor and uniformity of chemical composition. When boiling water is used under atmospheric pressure as the heat exchange medium for units 8—12, the temperature of the reaction mixture in this zone will be maintained at about 100° C. Regardless of the particular details of apparatus and operation, however, it is desirable that the reaction mixture be maintained between 85 and 150° C. during this portion of the reaction, and preferably between 90 and 120° C.

While the invention has been illustrated in connection with an operation in which excess ethylene oxide is stripped from the reaction mixture before the reaction product is contacted with water, the water may be added prior to the stripping operation without serious deleterious result. It is desirable, however, that the ethylene oxide be removed before addition of the water.

By adding the water prior to acidulation by treatment with a gaseous acidic substance such as carbon dioxide, the rate of the acidulating reaction is greatly increased, and by adding a sufficient quantity of water (e. g., 10%), the salts formed upon acidulation are dissolved, and remain in solution in the reaction product. These salts may be removed from the reaction product by the procedure as illustrated, by use of a smaller quantity of water. When it is desired to obtain a substantially anhydrous reaction product substantially free of salts, this may be accomplished by use of an amount of water sufficient to convert the catalyst to alkali metal hydroxide, but insufficient to dissolve the carbonate and bicarbonate salts formed by acidulation by treatment with carbon dioxide. The quantity of water added for this type of operation should not be substantially greater than the amount which will be associated with the salt (in the form of water of crystallization or otherwise) and removed therewith upon subsequent separation of the salt, as for example by filtration, which is preferably performed prior to deodorization in this embodiment. This may be accomplished by use of an amount of water constituting between one and ten molecular equivalents of the catalyst.

While the invention has been described in reference to an operation in which water is added separately prior to acidulation, the water may be added in the form of diluent for the acidulant, if desired. As a further alternative, the step of adding water may be entirely omitted, although as noted above, there is advantage in use of water to speed up acidulation.

Various aciduating agents may be used in lieu of carbon dioxide. Regardless of the particular acidulating agent used, it is advantageous to control the nature and/or amount of the acidic substance employed to provide a product which has a pH between 5 and 9 as measured in 10% aqueous solution. By control of the pH of the product within these limits, there is obtained a thioether reaction mixture which is stable during the subsequent deodorization and use. A feature of the invention consists in use of an acidic substance having a primary ionization constant between $10^{-2}$ and $10^{-9}$. By use of an acidic substance of this character, the control of the pH of the product can be attained without difficulty. Among the acidic substances which may be used to advantage in practice of the invention are carbon dioxide, acid clays, sodium bisulfate, and fatty and other carboxylic acids.

While the treatment of the acidulated product with steam or other gas to remove volatile and odoriferous impurities provides a product which is more desirable than would otherwise be obtained, this final treatment may be omitted if desired. As noted above, however, the product should be adjusted as to pH by treatment with an acidic substance, if the step of deodorization is to be performed. This step of deodorization may be accomplished at a temperature in the neighborhood of 100° C. or higher or lower temperatures by use of steam as the deodorizing agent, or other gases may be substituted in place of steam. In any case, it is advantageous to conduct the deodorizing operation at a temperature above 50° C. The deodorization may be accomplished, for example, by contacting the product with air, nitrogen or hydrogen in place of steam as illustrated, said contacting being accomplished either by blowing of steam or gas through a body of the heated product or alternatively by passing said heated product through a suitable column in countercurrent contact with the stream of the gas.

In the foregoing discussion, we have considered an embodiment of the invention in which the successive steps in the manufacturing operation are performed during flow of the reaction mixture continuously. Important advantages are derived from this type of operation. The passage of the reaction mixture continuously through a conduit in which the reaction takes place insures intimate contact of the reactants in successive zones of relatively small cross-sectional area. This facilitates control of the reaction by improving heat control and by minimizing the presence of large excesses of ethylene oxide in any one zone of the reaction. It thus minimizes formation of byproducts and formation of a reaction mixture including reaction products which vary widely as to number of ($CH_2CH_2O$) radicals. By operating continuously and introducing the ethylene oxide progressively as illustrated, these advantages are attained to an even greater extent by continuous operation than would otherwise be possible.

While, as noted above, continuous operation provides important advantages in practice of the invention, it is possible to practice features of the invention to advantage in a batch operation. Thus, the feature of conducting the initial reaction at a relatively low temperature and thereafter completing the reaction by operation at a higher temperature yields important advantages whether conducted continuously or batch-wise.

While the feature of progressive introduction of the ethylene oxide into the reaction mixture, conducted continuously or batch-wise, provides decided advantages as to operating technique and quality of product, this feature may also be eliminated, and the entire quantity of ethylene oxide introduced at the start of the reaction. It should be noted, however, that unusual precautions are necessary in control of the temperature if this type of operation is adopted, and that the progressive introduction of the ethylene oxide makes it possible to conduct the reaction more rapidly with adequate control, and with elimination of many of the difficulties which would be inherent in a process in which the entire quantity of ethylene oxide is introduced at the outset.

While the invention has been described with reference to an operation in which a large stoichiometric excess of ethylene oxide is ultimately condensed with the mercaptan, it should be understood that the feature of use of an unusually low temperature in the initial condensation step provides important advantages even in case it is desired to terminate the reaction at a stage at which the principal reaction product is the beta-hydroxyethyl thioether, or a product of condensation of from 1 to 3 ethylene oxide radicals with the mercaptan.

While the invention has been described primarily with reference to manufacture of thioethers of tertiary alkyl configuration by condensation of tertiary mercaptans with ethylene oxide, it may also be applied in condensation of primary and secondary mercaptans with ethylene oxide to form compounds having a primary or secondary alkyl radical in place of the tertiary alkyl radical of the products formed by the process discussed above for purposes of illustration.

The following examples illustrate practice of the invention:

EXAMPLE 1

*Tert-dodecyl-octaglycol thioether*

The process is conducted in an apparatus having the arrangement illustrated in the accompanying diagram. Two pounds of sodium methylate and 165 pounds of tert-dodecyl mercaptan (prepared by sulfhydration of triisobutylene) are mixed in kettle 3 for 30 minutes at a temperature of 65–75° C. and under a vacuum of 27 inches. The resulting solution, containing 4.5 mol per cent of sodium dodecyl mercaptide, is cooled to room temperature and is reacted with ethylene oxide in the following manner.

The mercaptan-mercaptide solution is pumped continuously at a rate of 61 lbs. per hr. together with ethylene oxide at a rate of 21.6 lbs. per hr. into a coil 7, comprising 200 ft. of ¼ in. steel tubing, immersed in a bath of water at 20° C.

The effluent is then passed successively through four coils 8—11 of ½ in. internal diameter which are immersed in boiling water baths, the reaction stream being admixed with an additional 21.6 lb. per hr. of ethylene oxide at the point of ingress to each of said coils. The effluent from coil 11, which comprises predominately the polyglycol thioethers in admixture with minor proportions of the corresponding sodium alcoholates and ethylene oxide, is further reacted at 100° C. in unit 12, a coiled steel tube 250 ft. long and ¾ in. in diameter, to effect substantially complete utilization of the ethylene oxide.

The resulting hot product-stream is freed of any remaining traces of ethylene oxide by application of vacuum and is pumped together with 10 lbs. per hr. of water to the upper section of the packed, neutralization column 16 wherein it descends countercurrent to a flow of 1 lb. per hr. of carbon dioxide.

The nearly neutral solution is then heated to 105° C. and is subjected at normal pressure (in an 8-tray, bubble-cap column 19) to countercurrent contact with a flow of steam, the latter being introduced at 150° C. at a rate of 275 lbs. per hr. Removal of undissolved carbonates, scale, etc. is accomplished in a final filtration step.

The product thus obtained is a neutral, clear, viscous oil, light yellow in color and practically without odor, and has an average ethoxy content of 7.8 mols per mol of polyglycol thioether. It enters readily into solution with water at all concentrations and shows a tendency to gel only at concentrations in the neighborhood of 50%. Standard launderometer and Draves tests, as well as tests in actual service, indicate its excellent wetting, detergent and grease-dispersing properties. Storage of samples of the product for a period of two months gives no perceptible diminution in activity.

EXAMPLE 2

*Tert-hexadecyl-dodecaglycol thioether*

By the procedure of Example 1, 52 lbs. per hr. of tert-hexadecyl mercaptan (prepared by sulfhydration of tetraisobutylene) is reacted with 108 lbs. per hr. of ethylene oxide and the product is stabilized and purified as described. It is an excellent emulsifying agent and has good detergent and wetting properties.

EXAMPLE 3

*Tert-nonyl-pentaglycol thioether*

A 4.5 mol per cent solution of sodium nonyl mercaptide in nonyl mercaptan (obtained by sulfhydration of propylene polymer) is prepared and is reacted at a rate of 78 lbs. per hr. with 108 lbs. per hr. of ethylene oxide in five stages by the procedure of Example 1. After purification of the resulting crude in the manner described, a nearly odorless clear liquid product is obtained having an average of 5.1 ethoxy units per mol. It is a very effective wetting agent.

EXAMPLE 4

*Tert-dodecyl-pentadecaglycol thioether*

A procedure substantially similar to that employed in Example 1 is followed in condensing ethylene oxide with tert-dodecyl mercaptan. In this instance, however, a solution containing 8 mol per cent of the sodium mercaptide is prepared and is pumped at a rate of 51 lbs. per hr. into confluence with a total of 128 lbs. per hr. of ethylene oxide, the latter being introduced in five separate streams. The product is purified in the manner described, and is found to contain an average of 14.7 ethoxy units per mol. It is an excellent detergent and a moderately good wetting agent.

EXAMPLE 5

*Sec-octyl-octaglycol thioether*

The general procedure and the apparatus of Example 1 are employed in preparation of a condensation product of approximately eight molar equivalents ethylene oxide with octane-2 thiol, the latter being derived by sulfhydration of the appropriate fraction of a gasoline synthesized from a natural gas source. In this instance the mercaptide concentration amounts to 2 mol per cent based on mercaptan, and the rate of flow of the mercaptan is adjusted to provide a contact period of 55 minutes in the reaction system. Neutralization and deodorization is accomplished in the described manner to provide a stable oily product of good appearance and odor and having a high degree of surface activity.

EXAMPLE 6

*Tert-dodecyl-tetraglycol thioether*

Tertiary dodecyl mercaptan and 50% sodium hydroxide are contacted at 80° C. in vacuo to provide an anhydrous solution containing 3 mol per cent of the mercaptide. The mixture is cooled to 20° C. and is pumped together with 4 molecular proportions of ethylene oxide through a series of two reactor coils, the first of which is 0.15 inch in internal diameter and is immersed in an ice bath, and the second of which is 0.4 inch in diameter and is immersed in a bath of boiling water. The reaction period in the first coil is 2 minutes and in the second coil is 20 minutes. The effluent from the second reactor, which contains substantially no free ethylene oxide, is diluted with 0.1 proportion of water and is circulated at about 50° C. through a plate and frame filter press precoated with Retrol (an acid clay) until the pH of the product, as measured in 10% aqueous solution, is reduced to a value between 6 and 7. The product, though having a mildly unpleasant odor, undergoes no apparent degradation at room temperature in a period of six months. It is particularly effective in promoting contact between petroleum oils and water or moist surfaces.

EXAMPLE 7

*Tert-dodecyl-octaglycol thioether*

The procedure of Example 1 is followed in all respects with the exception of the neutralization step. In this instance neutralization is accomplished by treating the aqueous solution of the crude polyglycol thioether with glacial acetic acid (2.1 lbs. per hr.) in lieu of carbon dioxide. The solution which, when diluted, is almost neutral to pH paper is subjected to the deodorization step of Example 1. The resulting octaglycol thioether is stable and odor free.

EXAMPLE 8

*Tert-dodecyl-octaglycol thioether*

A crude reaction mixture prepared in accordance with the procedure of Example 1 is diluted with water introduced prior to the the neutralization step at the rate of 3 lbs. per hr. The resultant is then neutralized with carbon dioxide in the described manner and is filtered immediately thereafter. The major proportion of the water and the carbonates are thus eliminated in the form of a moist, partially hydrated cake to provide a substantially anhydrous and salt-free product. The resulting polyglycol thioether is especially suitable for blending with fatty acid soaps and with other detergent and wetting compositions in uses requiring the absence of inorganic salts.

EXAMPLE 9

*Tert-eicosyl-dodecaglycol thioether*

0.5 lb. mols per hr. of tert-eicosyl mercaptan (derived by sulfhydration of petene-2 tetramer) and 12 lb. mols per hr. of ethylene oxide are condensed continuously in the presence of a catalytic quantity of the corresponding potassium mercaptide, and the product is neutralized and deodorized, substantially in accordance with the procedure of Example 1.

EXAMPLE 10

*Tert-dodecyl-dodecaglycol thioether*

The crude polyglycol thioether derived by the condensation of tert-dodecyl mercaptan with 12 molar equivalents of ethylene oxide at 100°–120° C. in the presence of the corresponding sodium mercaptide is almost black and has a strong, objectionable odor. It is made substantially neutral by treatment with water and carbon dioxide and is thereafter heated to 110° C. and is blown with superheated steam for 15 minutes. The resulting product is still dark in color but is almost odorless and does not diminish in surface activity over a period of six months.

EXAMPLE 11

*Tert-dodecyl-beta-hydroxyethyl sulfide*

7.5 gram mols of tert-dodecyl mercaptan and 0.1 mol of its sodium mercaptide is placed in a two-gallon, stainless steel autoclave which is then freed of air by application of vacuum. While the temperature of the reactants is maintained below 60° C., 7.8 gram mols of ethylene oxide is introduced gradually over a period of 15 minutes. The resulting product, after being freed of unreacted ethylene oxide, consists essentially of the desired glycol thioether in the form of a light amber oil. It may be purified by extraction or by distillation at reduced pressure, or polyethoxy derivatives may be prepared by reaction of the crude material with a further quantity of ethylene oxide at temperatures above 85° C.

Various modifications are available to persons skilled in the art, and we do not therefore wish to be limited except by the scope of the following claims.

We claim:

1. In a process for the condensation of a mercaptan with ethylene oxide in the presence of a catalyst for said condensation, the steps comprising flowing a stream originally containing said mercaptan, said catalyst and at least 0.5 molecular equivalent of ethylene oxide based on mercaptan through an initial reaction zone maintained under temperature conditions below 75° C. but sufficiently high to initially condense ethylene oxide with said mercaptan, and thereafter flowing said stream with ethylene oxide present through a succeeding reaction zone maintained under temperature conditions between 85° C. and 150° C. to further condense ethylene oxide in said stream.

2. In a process for the condensation with ethylene oxide of a tertiary alkyl mercaptan containing between 6 and 24 carbon atoms per molecule and derived from a polymerized olefin, in which condensation an alkaline catalyst for said condensation is employed to assist said condensation, the steps comprising flowing a stream originally containing said mercaptan, said catalyst and at least 0.5 molecular equivalent of ethylene oxide based on mercaptan through at least two successive reaction zones, in the first of which temperature conditions are maintained below 75° C. but sufficiently high for initial condensation to take place between said mercaptan and said ethylene oxide and in a succeeding one of which temperature conditions are maintained between 85° C. and 150° C., maintaining the reactants of said stream in said first reaction zone for a time sufficient to initially condense at least 0.5 molecular equivalent of ethylene oxide based on mercaptan with said mercaptan, and thereafter flowing said stream with ethylene oxide present through said succeeding reaction zone to effect further condensation of ethylene oxide in said stream.

3. The process of claim 2 in which a separate stream of ethylene oxide is combined with said stream of reactants downstream from said first reaction zone, and in which said combined streams are reacted in a reaction zone which is downstream from the said first reaction zone.

4. In a process for the condensation with ethylene oxide of a teritiary alkyl mercaptan containing between 6 and 24 carbon atoms per molecule and derived from a polymerized olefin, in which condensation an alkaline catalyst for said condensation is employed to assist said condensation, the steps comprising maintaining a flowing stream originally containing said mercaptan, said catalyst and from 0.5 to 3 molecular equivalent of ethylene oxide based on mercaptan under temperature conditions maintained between 0° C. and 65° C. for a time sufficient to react at least 0.5 molecular quivalents of ethylene oxide based on mercaptan with said mercaptan, thereafter combining a separate stream of ethylene oxide with said first-mentioned stream and maintaining the reactants of said combined streams under temperature conditions maintained between 85° C. and 150° C. for a time sufficient to effect desired further condensation therein.

5. The process of claim 4 in which the tertiary alkyl mercaptan is derived from tri-isobutylene.

6. The process of claim 4 in which approximately one molecular equivalent of ethylene oxide based on mercaptan is reacted with said mercaptan in the initial reaction.

7. The process of claim 6 in which the initial reaction is carried to substantial completion.

8. The process of claim 4 in which a large stoichiometric excess of ethylene oxide is ultimately condensed with said mercaptan.

9. The process of claim 8 in which from 0.01 to 0.1 molecular equivalent of catalyst based on mercaptan is employed.

10. The process of claim 9 in which a plurality of reaction zones are employed downstream from the first reaction zone, and in which a separate stream of ethylene oxide is combined with said first-mentioned stream at each or more than one of said downstream reaction zones.

11. In a process for the condensation of a mercaptan with ethylene oxide with the aid of a catalyst for said condensation, the steps comprising combining said mercaptan, said catalyst and said ethylene oxide to effect initial condensation between said mercaptan and said ethylene oxide, maintaining the temperature of the reaction mass below 75° C. during said initial condensation, thereafter subjecting the reaction mass with unreacted ethylene oxide present to temperature conditions between 85° C. and 150° C. to effect condensation of ethylene oxide with said initial condensation product.

JOHN B. DAVIDSON.
JOHN F. OLIN.

REFERENCES CITED

The following references are of record in the file of this patent:

UNITED STATES PATENTS

| Number | Name | Date |
|---|---|---|
| 2,129,709 | Schuette et al. | Sept. 13, 1938 |
| 2,205,021 | Schuette et al. | June 18, 1940 |
| 2,392,103 | Schlosser et al. | Jan. 1, 1946 |

FOREIGN PATENTS

| Number | Country | Date |
|---|---|---|
| 794,830 | France | Dec. 26, 1935 |